(12) United States Patent
Seiler et al.

(10) Patent No.: US 11,518,603 B2
(45) Date of Patent: Dec. 6, 2022

(54) CARTRIDGE, DISPENSING ASSEMBLY AND METHOD OF MANUFACTURING A CARTRIDGE

(71) Applicant: Sulzer Mixpac AG, Haag (CH)

(72) Inventors: Philipp Seiler, Au (CH); Tobias Bodenmüller, Eriskirch (DE)

(73) Assignee: MEDMIX SWITZERLAND AG, Haag (CH)

( * ) Notice: Subject to any disclaimer, the term of this patent is extended or adjusted under 35 U.S.C. 154(b) by 29 days.

(21) Appl. No.: 17/280,337

(22) PCT Filed: Aug. 2, 2019

(86) PCT No.: PCT/EP2019/070893
§ 371 (c)(1),
(2) Date: Mar. 26, 2021

(87) PCT Pub. No.: WO2020/069783
PCT Pub. Date: Apr. 9, 2020

(65) Prior Publication Data
US 2021/0362938 A1 Nov. 25, 2021

(30) Foreign Application Priority Data

Oct. 2, 2018 (EP) ..................................... 18198347
Apr. 12, 2019 (EP) ..................................... 19168898

(51) Int. Cl.
*B65D 83/00* (2006.01)
*B65D 81/32* (2006.01)
(Continued)

(52) U.S. Cl.
CPC .......... *B65D 83/0072* (2013.01); *B29C 45/14* (2013.01); *B29C 45/14336* (2013.01);
(Continued)

(58) Field of Classification Search
CPC .. B65D 83/0072; B65D 81/325; B65D 83/00; B65D 35/08; B65D 35/12; B29C 45/14336; B29C 45/14; B29L 2031/715
See application file for complete search history.

(56) References Cited

U.S. PATENT DOCUMENTS 3,275,193 A 9/1966 Barr
3,467,283 A 9/1969 Kinnavy
(Continued)

FOREIGN PATENT DOCUMENTS

EP 0 992 438 A1 4/2000
EP 1 058 657 B1 5/2003
(Continued)

OTHER PUBLICATIONS

International Search Report and Written Opinion dated Nov. 4, 2019 in corresponding International Patent Application No. PCT/EP2019/070893, filed Aug. 2, 2019.
(Continued)

*Primary Examiner* — Frederick C Nicolas
(74) *Attorney, Agent, or Firm* — Global IP Counselors, LLP

(57) ABSTRACT

A cartridge for a medium to be dispensed includes a rigid head part having a dispensing outlet and a flexible film forming a cartridge wall. The film bounds a cartridge chamber for the medium and extends partially in a longitudinal direction of the cartridge. The head part includes a collar surrounding the dispensing outlet in a radially outer region of the head part, and the collar extends in the longitudinal direction and has an inner circumferential surface. A front end of the film is sealingly and non-releasably connected to the inner circumferential surface of the collar.

(Continued)

Attachment of the film to the inner circumferential surface of the head part is at a contact surface that is different from the outer surface of the film.

24 Claims, 4 Drawing Sheets

(51) Int. Cl.
*B29C 45/14* (2006.01)
*B65D 35/12* (2006.01)
*B65D 35/08* (2006.01)
*B29L 31/00* (2006.01)

(52) U.S. Cl.
CPC .............. *B65D 35/08* (2013.01); *B65D 35/12* (2013.01); *B65D 81/325* (2013.01); *B65D 83/00* (2013.01); *B29L 2031/715* (2013.01)

(56) References Cited

U.S. PATENT DOCUMENTS

| | | | |
|---|---|---|---|
| 3,905,517 A | 9/1975 | Friedrich et al. | |
| 3,979,025 A | 9/1976 | Friedrich et al. | |
| 4,233,725 A | 11/1980 | Burger | |
| 5,305,920 A | 4/1994 | Reiboldt et al. | |
| 5,409,143 A | 4/1995 | Sigel et al. | |
| 5,593,066 A | 1/1997 | Konuma et al. | |
| 5,647,510 A * | 7/1997 | Keller | B05C 17/00513 222/105 |
| 6,334,548 B1 | 1/2002 | Ichikawa | |
| 6,578,738 B1 * | 6/2003 | Keller | B05C 17/00583 222/326 |
| 6,766,921 B2 * | 7/2004 | Keller | B65D 75/5883 222/137 |
| 7,445,135 B2 | 11/2008 | Miyata et al. | |
| 8,276,755 B2 | 10/2012 | Matsumura et al. | |
| 9,238,544 B2 | 1/2016 | Schulz et al. | |
| 9,517,488 B2 | 12/2016 | Frey | |
| 9,968,959 B2 | 5/2018 | Frey | |
| 2004/0000562 A1 | 1/2004 | Gantner | |
| 2006/0144854 A1 | 7/2006 | Clemens et al. | |
| 2010/0108709 A1 | 5/2010 | Frey | |
| 2014/0174037 A1 | 6/2014 | Frey | |
| 2016/0045928 A1 | 2/2016 | Frey | |
| 2017/0072426 A1 | 3/2017 | Frey | |
| 2018/0169693 A1 | 6/2018 | Frey | |
| 2022/0184654 A1 * | 6/2022 | Lavelanet | B05C 17/00583 |

FOREIGN PATENT DOCUMENTS

| | | |
|---|---|---|
| EP | 1 266 844 B1 | 1/2007 |
| EP | 1 284 163 B1 | 3/2008 |
| EP | 2 322 449 B1 | 6/2012 |
| EP | 3 195 941 A1 | 7/2017 |
| FR | 2820127 A1 | 8/2002 |
| JP | H03-133748 A | 6/1991 |
| JP | 3624132 B2 | 3/2005 |
| JP | 4248694 B2 | 4/2009 |
| JP | 2015-500776 A | 1/2015 |

OTHER PUBLICATIONS

Extended European Search Report dated Apr. 18, 2019 in corresponding European Patent Application No. 18198347.9, filed Oct. 2, 2018.

\* cited by examiner

CARTRIDGE, DISPENSING ASSEMBLY AND METHOD OF MANUFACTURING A CARTRIDGE

CROSS-REFERENCE TO RELATED APPLICATIONS

This application is a U.S. National Stage application of International Application No. PCT/EP2019/070893, filed Aug. 2, 2019, which claims priority to European Patent Application No. 18198347.9, filed Oct. 2, 2018 and European Patent Application No. 19168898.5, filed Apr. 12, 2019, the contents of each of which are hereby incorporated herein by reference.

BACKGROUND

Field of the Invention

The present invention relates to a cartridge for a medium to be dispensed comprising a rigid head part having a dispensing outlet and a flexible film forming a cartridge wall, with the film bounding a cartridge chamber for the medium to be dispensed, extending at least partially in a longitudinal direction of the cartridge and having a front end that is connected to the head part. The invention further relates to a dispensing assembly and to a method of manufacturing a cartridge.

Background Information

In the industrial sector, in the construction industry, for example of buildings, and in the dental sector, cartridges are frequently used to store flowable liquids, frequently pasty or viscous to highly viscous substances and to dispense them for the respective application as required. Examples for such substances are joint sealing compounds, compounds for chemical dowels or chemical anchors, adhesives, pastes or impression materials in the dental sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the components are intimately mixed at dispensing by a dynamic or static mixing apparatus. Examples for this are two-component adhesives or chemical dowels which only harden after the mixing of the two components.

Two-component systems are in particular also used in the industrial sector for paints which are often used to generate functional protective layers such as for corrosion protection.

SUMMARY

For reasons of environmental protection, film cartridges are increasingly being used. In contrast to regular cartridges which are completely produced from plastic in an injection molding process, at least parts of film cartridges are designed as a flexible film. Usually the cartridge wall bounding the cartridge chamber is made of a film which is connected to a head part made of rigid material, e.g. plastic, comprising the dispensing outlet. This has several advantages. On the one hand, the unfilled film cartridges can be stored and transported in a collapsed state from the cartridge manufacturers to the manufacturers of the filling materials (media) who then take care of the filling of the empty cartridges. Only after being filled the film cartridge is in its expanded state which is comparable in size to a regular non-collapsible cartridge. This means that the necessary space for storage and for transportation can be reduced, since the collapsed cartridges have a reduced size in comparison to regular non-collapsible cartridges.

On the other hand, once the cartridges have been used, i.e. reduced to the collapsed state by dispensing the filling material, the cartridges are significantly reduced in size and weight in comparison to regular cartridges so that the cost of disposal is also reduced. In any case the carbon footprint associated with the film cartridges is reduced in comparison to plastic cartridges that are completely formed in an injection molding process.

It has been determined that during the manufacture of a film cartridge with an injection molded head, one has to sealingly attach a film to the rigid head part. For this, a required length or size of the film has to be cut from a larger film piece or film roll. If this cut or trimmed film is attached to the head part, a cutting area of the film where the film was cut can pose a problem: as a result of the cut, individual fiber-like or hair-like film parts of the film could become loose or detached from the main surface of the film in the cutting area of the film. The connection of the head part with a section of the film which includes such a cutting area could thus lead to a leak or faulty attachment in the region of the parts of the film comprising such a cutting area. Prior art containers are known from EP 0 992 438 A1, and US 2010/108709 A1.

For this reason, it is an object of the invention to create a cartridge with an as low a carbon footprint as possible, with the cartridge avoiding the presence of leaks and/or faulty attachments between the film and the head part so that a storage life of components stored in the cartridge can be ensured. It is a further object of the invention to create a method of manufacturing of such a cartridge.

This object is satisfied by a cartridge for the medium to be dispensed, wherein the cartridge comprises a rigid head part having a dispensing outlet and a flexible film forming a cartridge wall. The rigid head part of the cartridge is for example a stable shaped part that is formed by injection molding.

The flexible film comprises at least one inner surface and an outer surface, wherein the film respectively an innermost surface of the film bounds a cartridge chamber for the medium to be dispensed. The film extends at least partially in the longitudinal direction of the cartridge. The film comprises a front end that is connected to the head part. The head part comprises a collar which surrounds the dispensing outlet in a radially outer region of the head part. The collar extends in the longitudinal direction and comprises an inner circumferential surface. The front end of the film is sealingly and non-releasably connected to the inner circumferential surface of the collar. For example, the front end of the film is connected to the inner circumferential surface of the collar by any one or a combination of any of the following processes: by injection molding, by gluing, by welding, in particular ultrasonic welding, by shrinking, by clamping or by mounting.

In this connection it should be noted that a flexible film bag is a film bag that can be folded together in the empty state, e.g. in the manner of a concertina, and that after filling and a possible dispensing of the components present therein can be unfolded and refolded without the film bag being damaged or becoming limited in its function.

It should be noted that the inner circumferential surface of the collar is a surface located radially inwards of an outer circumferential surface of the collar. For example, the collar has a hollow cylindrical shape. In this embodiment, the inner circumferential surface bounds a space within the hollow cylindrical shape.

Sealingly and non-releasably connected in the present disclosure means that there will be no leakage of the cartridge contents during storage or use and that the cartridge will not detach from the head piece during normal storage and use conditions.

It has been found that better sealing and non-releasable connections can generally be obtained between materials having similar or compatible compositional properties, such as polyolefins with polyolefins, particularly PE with PE or PP with PP, or polyamides with polyamides, such as Nylon 6 or Nylon 66 with themselves or with each other, and/or through the use of surface roughening, surface modification treatments such as corona discharge to increase the surface energy and/or to introduce polar groups, primers and/or adhesives into the respective composition.

In addition to application testing, other test methods include measurements of sealing via qualitative means or measures, such as pressing air-filled cartridges under water and inspecting for bubbles or more quantitative methods such as leak gas detectors, vacuum burst or creep tests and seal strength measurements, and measurements of bond strength include measurements of tensile, peel or stripping strength.

Furthermore, it is desirable that the connection does not release during storage and especially use and, for example, is capable of withstanding pressures of at least 5 Bar and preferably of up to 55 bar, i.e. the pressures that may arise on dispensing material from the cartridge chamber.

In this connection it should be noted that the application filed by the present applicant at the European Patent Office on the same date as the present application and having the attorney reference S14045PEP and the application DE202018105661.1 filed at the German Patent and Trademark Office are respectively hereby incorporated by reference.

According to embodiments of the invention, the inner circumferential surface of the collar is attached to the film at a contact surface that is different from the outer surface of the film. In other words, the front end of the film is attached to the inner circumferential surface of the collar by a contact surface that is not the outer surface of the film. As a result, the outer surface of the film which extends in the longitudinal direction of the cartridge in a region of the film which is not covered by the collar of the rigid head part is different from the contact surface of the film that is attached to the inner circumferential surface of the collar of the head part.

For example, the contact surface can correspond to the inner surface of the film at the front end of the film, while a portion of the film extending outside the collar comprises the outer surface of the film that is positioned radially outwardly of the inner surface of the film. The film can also comprise a surface different from the outer surface and the inner surface, which could be attached to the inner circumferential surface of the collar and which can provide the contact surface. Such a contact surface can correspond to a surface of a specific, in particular inner, layer of the film.

Choosing a surface at which the front end of the film is attached to the inner circumferential surface of the collar that is different from the outer surface avoids possible structural defects of the outer surface from interfering with a tightness or impermeability of the bond or attachment between the film and the collar of the head part.

The structural defects of the outer surface of the film could, for example, arise from a cut at the front end of the film during a manufacturing process of the film, on the result of which hair-like or fiber-like pieces of the outer surface of the film could detach themselves from the rest of the film. Embodiments of the invention therefore offer the advantage that a tight seal between the film and the collar all the head part is provided, such that the risk of leakage of the medium comprised by the cartridge at the head part is minimized.

Preferably the contact surface corresponds to one of the at least one inner surfaces of the flexible film. Such an inner surface can correspond to an inner layer of the film. Alternatively, the contact surface can correspond to a surface of an additional flexible film piece. The additional flexible film piece has a longitudinal extension that is shorter than the longitudinal extension of the flexible film forming the cartridge wall. The additional flexible film piece can overlap with the front end of the flexible film forming the cartridge wall. However, the additional flexible film piece does not extend beyond the collar of the head part, such that the outer surface of the flexible film forming the cartridge wall still does not correspond to the contact surface at which the film is attached to the collar.

Advantageously the inner circumferential surface of the collar and the contact surface are bonded together to form an integral connection structure. In other words, at least a portion of the inner circumferential surface of the collar forms, together with the surface of the film attached thereto, a uniform structure which extends in a transverse direction of the cartridge in a region overlapping at least a portion of said collar and said film. Due to the integral structure, a tight sealing between the film and the collar of the head part can be advantageously ensured.

Preferably the film is a multilayer film that comprises an outermost layer which defines the outer surface of the film. The multilayer film comprises at least one inner layer arranged radially inwardly of the outermost layer. The outermost layer and the at least one inner layer are formed from different materials. The multilayer film can further comprise at least two inner layers that are also formed from different materials, for example, metal, e.g. aluminium or an aluminium alloy or plastic inner layers.

The inner circumferential surface of the collar is attached to a layer of the multilayer film that is different from the outermost layer of the film. For example, the inner circumferential surface of the collar can be attached to one of the at least one inner surfaces of the film. Preferably, each layer of the film is different than an adjoining layer of the film. Each layer of the film thereby provides a surface made of a certain material that can be different from the material of the outermost layer.

Preferred materials for the different layers of the multilayer film include polyethylene, polyamide, polypropylene and/or aluminum. The use of different materials allows a flexible film to be created that fulfills multiple conditions in regard to the requirements for material properties that depend on the layer of the film. For example, the innermost layer of the film bounding the medium to be dispensed has to be chosen such that a sticking of the medium dispensed to the innermost layer is avoided, while the outermost layer of the film has to be chosen such that an entry of external particles and/or a leakage of the dispensed medium is avoided.

Preferably, the material of the outermost layer and the material of the collar are different and are materials which either do not form a bond during the manufacturing process or only form a bond that is weaker than a bond formed at the contact surface. The material of the at least one inner layer of the multilayer film and the material of the collar are configured to form a bond via which no leaks arise and that is capable of withstanding pressures of at least 5 Bar, i.e. the pressures that arise on dispensing material from the cartridge chamber.

In this connection it should be noted that measurements of relative bond strengths between materials can be carried out by measuring the tensile, peel or stripping strength and that better thermal bonding can be achieved between materials that are compositionally similar or compatible or through the use of surface treatments, primers or adhesives.

It should further be noted that materials that have low surface energies and/or are nonpolar (lacking polar functional groups) tend to not bond well.

It should further be noted that melting properties of plastics can be measured by differential scanning calorimetry (DSC) and melt flow properties of plastics can be measured by melt flow index (MFI), melt flow rate (MFR) and melt volume rate (MVR) methods.

Preferably, the head part is formed by an injection molding process, wherein the material of the outermost layer is configured to melt away in the region of the front end of the film due to the processing temperature during the injection molding process so that the at least one inner layer and the inner circumferential surface of the collar are bonded one to another during the injection molding process.

Disappearance of the material of the outermost layer occurs for example due to degradation of the material at high temperatures. Alternatively, the already formed rigid head part can be bonded to the film during a second heating process, for example during a welding process or in particularly a sonic welding process, wherein the material of the outermost layer is configured to disappear or disintegrate in the region of the front end of the film due to this second heating process.

In this connection the head part can have a Shore D hardness selected in the range of 40 to 99. Preferably the Shore D hardness of the head part lies in the range of 40 to 60.

The head part can comprise polyethylene, polypropylene, polyamide, polyethylenterephthalate or polybutylenterephthalate. The head part can for example comprise polyamide in the form of PA-6 (perlon) or PA-66 (nylon). Polyamide has the advantage that it has a good mechanical stability and is thus suitable for the head part.

Polyethylenterephthalats (PET) can also be used for the head part. PET can namely be processed in a facile manner and has a good chemical resistance.

In accordance with an embodiment the head part is made of a high density PE (HDPE). High density polyethylene (HDPE) has a density in the range of 930 kg/m$^3$ to 970 kg/m$^3$ auf.

One can also consider forming the head part and/or the film bag of a material that has been recycled, for example recycled by 100%, such as HDPE, green PE (e.g. made of sugar cane) and PP.

Alternatively, the material of the head part and/or of the film bag can comprise a compound which is formed by a mixture of green PE with normal PE, a mixture of green PE and recycled PE, or a mixture of normal PE with green PE and recycled PE. Also compounds comprising recycled PP, partially recycled PP and/or normal PP can be used in injection molding processes of the head part and/or as the material of the cartridge wall. The use of such recycled materials leads to a more environmentally friendly cartridge.

The head part and/or the film bag can additionally be reinforced with further material such as through the use of fibers, such as natural fibers, wood fibers, cellulose fibers, hemp fibers, cork fibers, fibers from sun flower seeds, grass fibers, bamboo fibers, flax or carbon fibers.

By way of example, PP, TPE, TPS can each be injection molded together with cork fibers. PE, PP, PLA, PBS, and/or PBAT can be used in injection molding processes together with wood or natural fibers. PA, PE and/or PP can be injection molded together with a wide range of natural fibers. PP and/or PE can be injection molded together with fibers from sun flower seeds. PE, PP, and/or PLA can be injection molded together with fibers grass fibers, flax. It is also possible to injection mold thermoplastic materials not only with one kind of fiber but a mixture of types of fibers.

The cartridge can be a single component cartridge having only one cartridge chamber bound by the flexible film forming the cartridge wall. Such a cartridge can expediently store single component mastic materials, sealants and the like.

A second film can be attached to the head part to cover an internal end face of the head part, optionally with the second film bridging an outlet passage leading from the cartridge chamber to an end of the dispensing outlet. Such a second film can prevent diffusion of components present in the material stored in the cartridge via the end face.

Such cartridges can be filled both using front filling techniques and back filling techniques, with the cartridge having a second film that also extends so as to cover the passage of the dispensing outlet generally only being able to be used in backfilling applications.

The film forming the film bag can be a multilayer film having at least two layers formed from different materials. In the preferred choice the film is a five-layer film comprising a sandwich structure in which the outer layer is formed of PE (20 to 40 μm thickness) which is connected to a layer of PA (10 to 20 μm) via a tie layer (1.5 to 2.5 μm). The PA layer in turn is connected via a further tie layer (1.5 to 2.5 μm) to an aluminum or aluminum alloy layer (5 to 10 μm). The aluminum or aluminum alloy layer is in turn connected to a further PA layer (10 to 20 μm) via a further tie layer (1.5 to 2.5 μm) which is then connected to an inner layer corresponding to the inner surface 42, via a via a further tie layer (1.5 to 2.5 μm) with the inner layer having a thickness selected in the range of 45 to 100 μm.

The film forming the film bag can be a three-layer film comprising a sandwich structure in which the first layer is formed of polyethylene (PE) (20 to 40 μm thickness), which is connected to a second layer of aluminum (Al) or of an aluminum alloy (Al alloy) (7 to 12 μm thickness) via a tie layer (1.5 to 2.5 μm thickness). The Al or AL alloy layer is in turn connected to a third PET layer (12 to 15 μm thickness) via a further tie layer (1.5 to 2.5 μm thickness).

The film forming the film bag can be a four-layer film comprising a sandwich structure in which the first layer is formed of PE (20 to 40 μm thickness), which is connected to a second layer of aluminum (Al) or of an aluminum alloy (Al alloy) (7 to 12 μm thickness) via a tie layer (1.5 to 2.5 μm thickness). The Al or AL alloy layer is in turn connected to a third layer of PA (10 to 20 μm thickness) via a tie layer (1.5 to 2.5 μm thickness). The third layer of PA is in turn connected to a fourth layer of PE (15 to 30 μm thickness) via a further tie layer (1.5 to 2.5 μm thickness).

It should be noted that the respective tie layers are not considered to be individual layers of a multi-layered film, they are merely present to ensure a bond is formed between the individual layers.

The materials of the film can differ from the above mentioned materials as can their respective thicknesses. It should be noted in this connection that the films typically have a thickness selected in the range of 40 to 200 µm, in particular of 70 to 200 µm, in particular of 120 to 170 µm.

The disappearance of the outer layer during either case of the heating process provides the advantage of creating a particularly tight bond between the film and the head part, such that a leaking-free cartridge can be provided. For example, the outermost layer is made of polypropylene, wherein the radially adjoining inner layer is made of polyethylene. The outermost layer made e.g. of a modified polypropylene is designed to have a lower sealing temperature than polyethylene, the film underlying the outermost layer. Therefore, the outermost layer disappears first during the heating process, leaving the adjoining inner layer to bond to the inner circumferential surface.

Preferably, the cartridge comprises an additional intermediate film piece that is disposed between the front end of the film and the inner circumferential surface of the collar. The intermediate film piece comprises an inner layer and an outer layer, wherein the material of the outer layer is configured to bond to the material of the inner circumferential surface of the collar and wherein the material of the inner layer is configured to bond to the material of the outer surface of the film. The materials of the inner layer and of the outer layer are preferably different and in particular materials which do not bond or form a bond that is less strong than the aforementioned bonds.

For example, the additional intermediate film piece is a multilayer film, wherein the outermost layer is made of the same material as the head part, wherein the innermost layer is the same material as the material of the outer surface of the flexible film forming the cartridge wall. The additional intermediate film piece can comprise further intermediate layers of different materials. During a bonding process, which for example includes injection molding and/or gluing and/or welding, the innermost layer of the additional film piece sealingly and non-releasably bonds to the outer layer of the flexible film, while the outermost layer of the additional film piece sealingly and non-releasably bonds to the inner circumferential surface of the collar of the head part. The additional intermediate film piece provides the advantage of strengthening the film at the connection part to the head part, therefore providing a particularly tight and tear-resistant seal.

Advantageously, the intermediate film piece covers in addition a rear surface of the head part defining a front end of the cartridge chamber and comprising the dispensing outlet. In particular, the intermediate film piece can be configured as a cap and/or cover lid that extends along the inner circumferential surface of the collar as well as a base surface of the collar of the head part. This allows the flexible film to only contact the intermediate film piece to which it is bonded to. The head part can be bonded to the intermediate film piece during an injection molding process, which can be separate from the bonding process of the intermediate film piece to the flexible film piece of the cartridge wall. This provides the advantage of allowing the sealing of the film to the head part to take place in two separate processes, allowing each process to be optimized according to the requirements of the respective bonding process. Alternatively the intermediate piece is bonded to both the film and the head part in the same process step.

Preferably, the front end of the film is folded to the outside so that the outer surface of the front end of the film contacts the outer surface of an adjacent portion of the film and the inner surface of the front end of the film faces radially outwardly, and wherein the folded front end of the film is connected to the inner circumferential surface of the collar via its inner surface.

In other words, the contact surface corresponds to the folded inner surface of the front end of the film. For example, the inner surface respectively the innermost layer of the film is made of a material that bonds to the material of the collar of the head part, wherein the material of the outer surface respectively the outer layer of the film is different and does not necessarily bond as strong or at all to the material of the collar.

Preferably, the inner surface respectively the innermost layer of the film is made of the same material as the collar and/or the head part. This provides the advantage that the outer layer and/or the outer surface of the flexible film forming the cartridge wall does not have to be chosen to fulfill the requirement of bonding strongly to the material of the head part. Instead, the material of the outer layer and/or the outer surface can be chosen in such a way that the best possible external protection of the cartridge in a section outside the head part can be ensured. A possible loss of an effectiveness of a degree of the protection due to the flexible nature of the film can thus be counteracted.

Preferably, the head part of the cartridge comprises plastic and/or consists of plastic. Advantageously at least the part of the film being connected to the head part also comprises plastic and/or consists of plastic. In particular, the plastic of the head part and the plastic of the part of the film being connected to the head part are selected from plastics which form a bond therebetween during the manufacturing process. For example, the plastic of the head part and the plastic of the part of the film being connected to the head part are identical. In this way, a particularly strong and tight connection between the film and the head part can be provided and the risk of leaks can be further minimized.

Preferably, the cartridge comprises additional fixation means or elements, in particular protrusions, ribs, pins, hooks, webs, notches, flutes, recesses, and/or grooves, wherein the additional fixation means are arranged at the inner circumferential surface of the collar. A particular strong connection between the head part and the film of the cartridge can therefore be ensured.

Preferably, the cartridge is a one-component cartridge comprising one cartridge chamber. Alternatively, the cartridge is a two-component cartridge comprising two cartridge chambers. Each cartridge chamber is preferably filled with a material. In particular, the materials of each cartridge can be different. The material can be liquid flowable, pasty, viscous or highly viscous. In particular, the material corresponds to a substance frequently used in an industrial sector and/or in the construction industry, for example in a building industry, and/or in the dental sector. For example, the material respectively substance corresponds to a joint sealing compound and/or a compound for chemical dowels or chemical anchors and/or an adhesive, a paste or an impression material for the dental sector.

If a two-component cartridge is used the head part of one cartridge chamber can be formed in one piece with the head part of the other cartridge chamber or the head part of one cartridge chamber can be connectable to the head part of the other cartridge chamber.

Preferably, a tubular support sleeve is provided which is configured to surround the cartridge wall over its whole length and which has a front end which is configured to abut or to be connected to the head part. The tubular support sleeve provides the advantage of supplementary protection of the medium to be dispensed and a protection of the flexible film.

The cartridge can be a single component cartridge having only one cartridge chamber bound by the flexible film forming the cartridge wall. Such a cartridge can expediently store single component mastic materials, sealants and the like.

A second film can be attached to the head part to cover an internal end face of the head part, optionally with the second film bridging an outlet passage leading from the cartridge chamber to an end of the dispensing outlet. Such a second film can prevent diffusion of components present in the material stored in the cartridge via the end face.

Such cartridges can be filled both using front filling techniques and back filling techniques, with the cartridge having a second film that also extends so as to cover the passage of the dispensing outlet generally only being able to be used in backfilling applications.

In this connection it has been noted that at least one of the head part, the second film and the cartridge wall, such as the first film or a solid cartridge wall, can also be a 3D printed component.

In this connection it should further be noted that 3D printing refers to a process in which material is joined or solidified under computer control to create a three-dimensional object, with material being complied to form the desired object. In some embodiments, a computer can refer to a smart phone, a tablet, a printer motherboard, a processor/computer in the printer, or any other device with a processor or an electronic controller. The material for the at least one of the head part, the second film and the cartridge wall can be any material, such as liquid molecules or powder grains that are capable of being fused together to form the respective component having the desired properties. In some embodiments, the at least one of the head part, the second film and the cartridge wall can be printed from one or more materials such as PA12, polypropylene, and/or glass filled polyamide. However, the material can be any suitable material or materials.

According to a further aspect the present invention relates to a dispensing assembly comprising the cartridge having one or more cartridge chambers, with the one or more cartridge chambers being filled with a material; a respective sleeve for each cartridge chamber; a dispenser into which the cartridge is inserted; and optionally a mixing tip attached to the dispensing outlet.

The advantages achievable with the cartridge can likewise be achieved with the dispensing assembly.

A further aspect of the present invention relates to a method of manufacturing of a cartridge in accordance with the teaching described therein, the method comprising the steps of:

placing the film on a core of a mold;

injection molding the head part in a head space of the mold to form the head part with its collar and to sealingly and non-releasably bond the front end of the film to the inner circumferential surface of the collar, with a contact surface between the front end of the film and the inner circumferential surface of the collar being different from the outer surface of the film.

The advantages associated with the cartridge likewise hold true for the corresponding features of the method of manufacturing the cartridge.

BRIEF DESCRIPTION OF DRAWINGS

The invention will be explained in more detail hereinafter with reference to the drawings.

DETAILED DESCRIPTION

Figure 1:
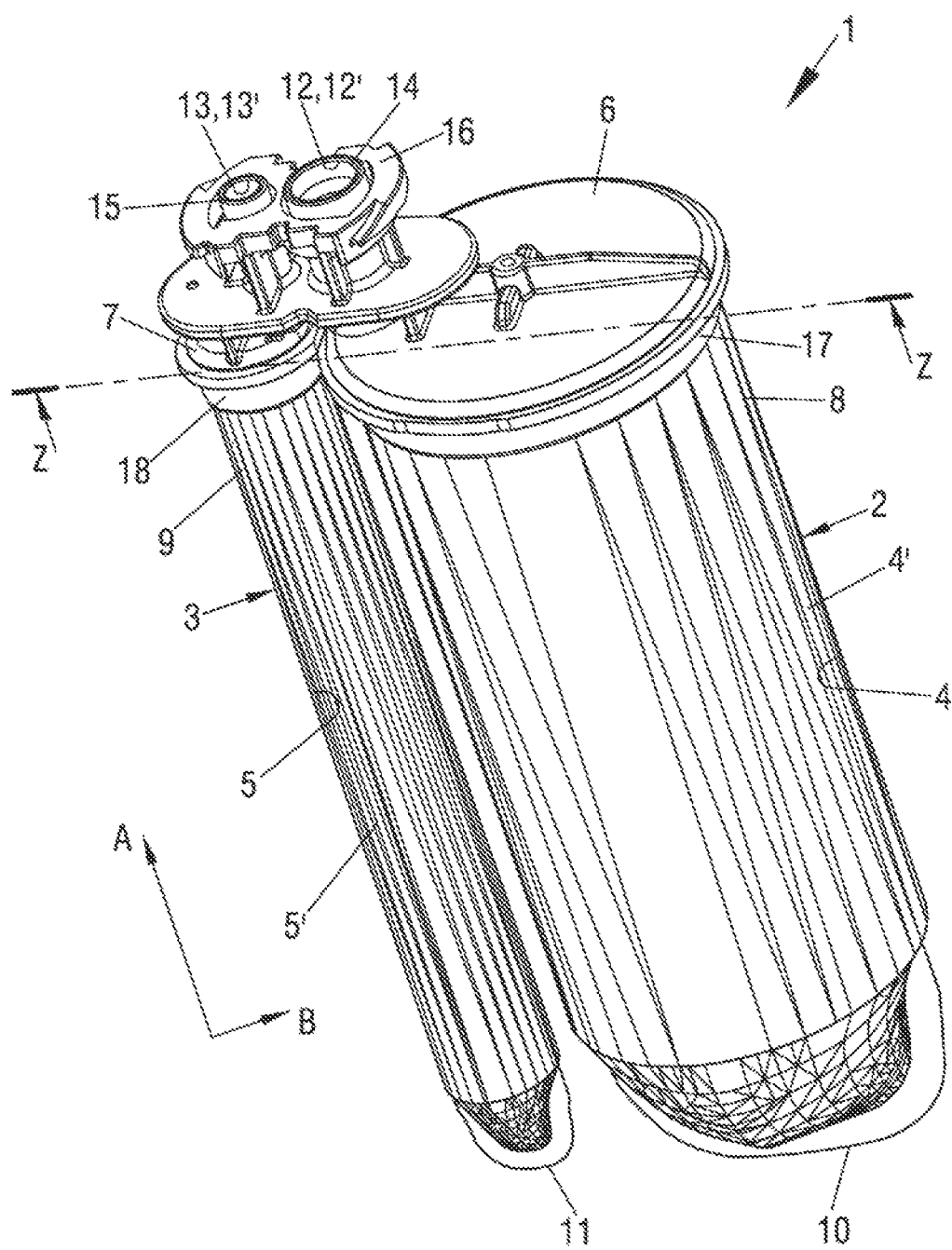
FIG. 1 is a perspective view of a two-component cartridge.

In the in the following the same reference numerals will be used for parts having the same or equivalent function. Any statements made having regard to the direction of a component are made relative to the position shown in the drawing and can naturally vary in the actual position of the application.

FIG. 1 shows a cartridge 1 configured as a two-component cartridge. The cartridge 1 comprises two generally cylindrical cartridge chambers 2, 3. The cartridge chambers 2, 3 are each bound by a cartridge wall 4, 5 as well as by a head part 6, 7, with each head part 6, 7 being arranged at a respective front end 8, 9 of the cartridge wall 4, 5. Each cartridge wall 4, 5 extends in a longitudinal direction A of the cartridge 1 from a respective rear end 10, 11 to the respective front end 8, 9.

Each head part 6, 7 is a stable shaped part of generally plate-like shape and comprises respective dispensing outlets 12, 13 via which a respective medium (not shown) can be dispensed from the cartridge chambers 2, 3. The two dispensing outlets 12, 13 extend from the head parts 6, 7 as outlet passages 14, 15 through a common outlet part 16. A mixing tip or closure part (each not shown) can be connected to the outlet part 16.

Each head part 6, 7 has a collar 17, 18, with each collar 17, 18 surrounding the dispensing outlet 12, 13 in a radially outer region of the head part 6, 7. A radial direction B is indicated relative to the arrow A used to identify the longitudinal direction A. Each collar 17, 18 has a length extending in the longitudinal direction A. The front end 8, 9 of each cartridge wall 4, 5 is sealingly and non-releasably connected to the collar 17, 18 of the head part 6, 7.

The cartridge walls 4, 5 are each formed from a film 4', 5'. Each rear end 10, 11 of the cartridge walls 4, 5, formed from the film 4', 5', is welded shut in a sealing manner in the present example to form a film bag.

It should be noted in this connection that the rear end 10, 11 could also be connected to a fixed shaped part (not shown). In this way the cartridge walls 4, 5 could be adapted to permit a movement of a piston (also not shown) relative to the cartridge walls 4, 5.

It should further be noted in this connection that the film 4', 5' forming the cartridge walls 4, 5 can be a multilayer film having at least two layers formed from different materials.

Such multi-layer films are used e.g. when particularly aggressive substances are stored in the cartridge 1.

It should also be noted that the film 4', 5', regardless of whether it is a film made from one type of material or a multilayered film made from one or more different types of materials, can have a thickness of at most 0.3 mm, more specifically of at most 0.15 mm, preferably of approximately 0.085 mm.

Figure 2:
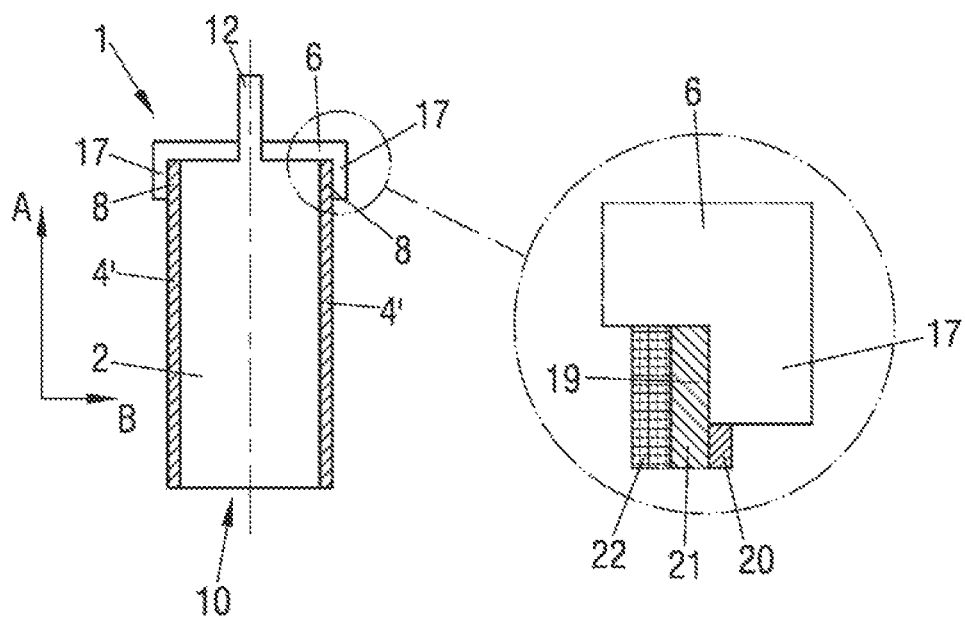
FIG. 2 is a sectional view of a one-component cartridge according to an embodiment and an enlarged view of a head part of the cartridge.
Figure 3:
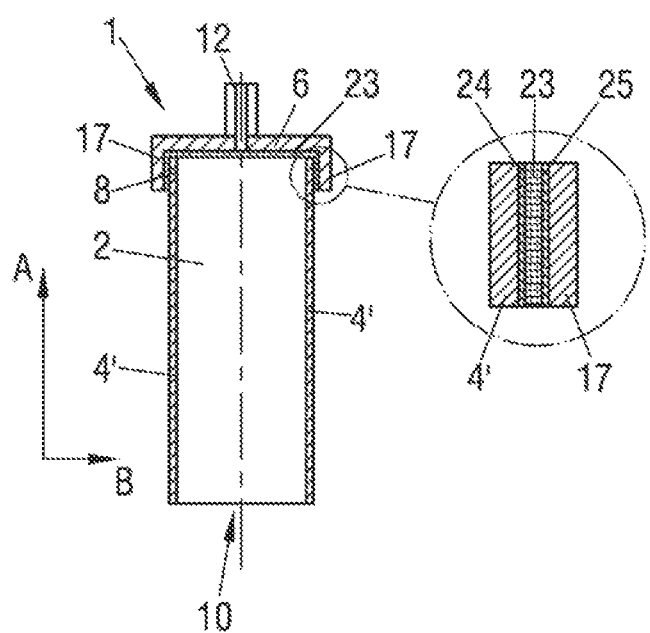
FIG. 3 is a sectional view a one-component cartridge according to another embodiment and an enlarged view of a head part of the cartridge.
Figure 4:
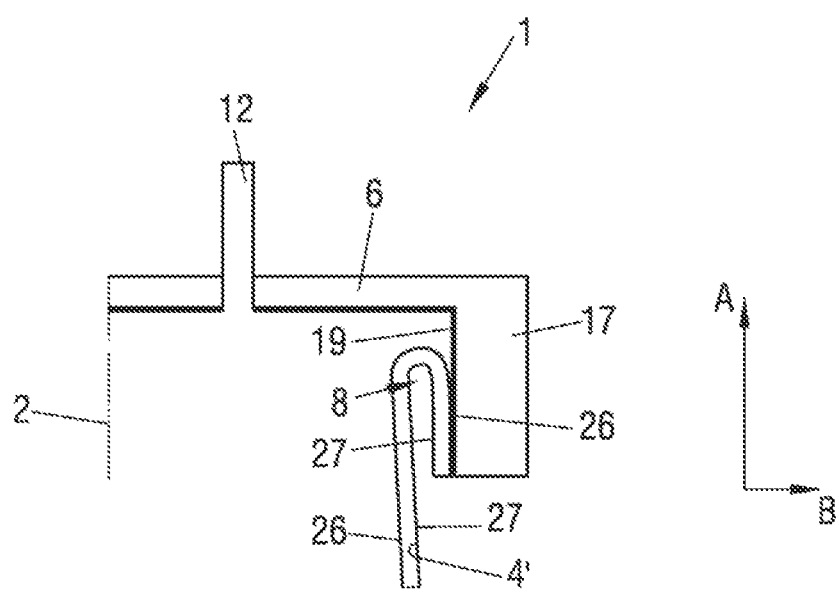
FIG. 4 is a part sectional view a one-component cartridge according to a further embodiment.

It should also be noted that the cartridge 1 can also be configured as a one-component cartridge (as shown in FIGS. 2, 3 and 4), comprising only one generally cylindrical cartridge chamber 2 with a single head part 6 and a film 4' forming the cartridge wall. In the following, corresponding features of the one-component cartridge and corresponding features of the two-component cartridge mutually hold true.

It is necessary that the connection between the film 4', 5' defining the cartridge wall 4, 5 to its respective head part 6, 7 is tightly sealed and does not leak such that the medium that is to be dispensed via the dispensing outlet 12, 13 does not leak from the cartridge 1 other than via the dispensing outlet 12, 13.

In the following FIGS. 2, 3 and 4, three different embodiments of the cartridge 1 are shown which allow such a sealed connection. The three embodiments of the cartridge 1 shown herein are each configured as a one-component cartridge 1, however, the embodiments shown can equally apply to the two-component cartridge shown in FIG. 1.

FIG. 2 shows a sectional view of the cartridge 1 configured as a one-component cartridge according to a first embodiment. The view corresponds to a section along the longitudinal direction A of the cartridge 1. The cartridge wall 4 bounding the cartridge chamber 2 comprises a flexible film 4'. For example, the flexible film 4' is cylindrically-shaped, wherein the rear end 10 of the film 4' corresponds to the rear end of the cartridge 1. A front end 8 of the film 4' is surrounded in a circumferential direction by a collar 17 of a head part 6, which can be arranged at the front end 8 to form an upper end of the cartridge 1.

The head part 6 includes a rigid material, like for example a plastic material, and can be formed by injection molding. The head part 6 comprises a dispensing outlet 12, here shown to extend longitudinally and outwardly of the cartridge chamber 2 in the longitudinal direction A. A medium or a material stored within the cartridge chamber 2 can be dispensed via the dispensing outlet 12.

The flexible film 4' is bonded to an inner circumferential surface 19 of the collar 17 of the head part 6. The inner circumferential surface 19 is positioned radially inwardly of an outer circumferential surface of the cylindrically-shaped collar 17 in the radial direction B. The collar 17 also extends in the longitudinal direction A, such that at least a portion of the longitudinal extension of the collar 17 overlaps with the front end 8 of the film 4'.

On the right-hand side of FIG. 2, an enlarged view of the connection of the collar 17 of the head part 6 to the film 4' is shown. The film 4' is configured as a multilayer film comprising multiple layers, here shown for example comprising three layers 20, 21, 22. The radially outermost layer 20 and the adjoining inwardly orientated layer 21 are made from different materials.

The material of the inner layer 21 and the material of the collar 17 are configured to form the desired bond between the film 4' and the head part 6'. The radially innermost layer 22 of the multilayer film defines an inner surface which bounds the cartridge chamber 2. Every layer 20, 21, 22 of the multilayer film can comprise different materials and can comprise a different thickness. The thickness of each layer can be chosen for example from a range of 1 µm to 50 µm, preferably from a range of 5 µm to 20 µm. In this connection it should be noted that bonding agents can be present between the individual layers 20, 21, 22 of the multilayer film 4' that are required to produce the film 4'.

The material of the outermost layer 20 is chosen such that during a heating process and/or a gluing process, the outermost layer 20 melts way at least in the front end region 8 of the film 4'. For example, the head part 6 is formed by an injection molding process, during which a certain temperature is applied to the head part 6 and the film 4'. The material of the outermost layer 20 is configured to melt away in the region of the front end 8 of the film 4' due to the processing temperature during the injection molding process. The material of the outermost layer 20 can alternatively disappear due to temperatures applied during another bonding process that is independent of the injection molding process. Such a bonding process for example corresponds to a welding and/or sonic welding process.

As a result of the injection molding process and/or the heating process, the material of the outermost layer 20 disintegrates in the front end 8 of the film 4' where the film 4' contacts the collar 17 of the head part 6. For example, the outermost layer 20 comprises a polypropylene material, wherein the inner layer 21 comprises a polyethylene material. Furthermore, the thickness of the layer 20 can be smaller than the thickness of the layer 21.

The polypropylene disintegrates during the injection molding process and/or the heating process of the head part 6, such that within the collar 17, the inner layer 21 of the film 4' directly bonds to the inner circumferential surface 19 of the collar 17. Preferably, the material of the collar 17 is the same as the material of the inner layer 21, for example a polyethylene material, such that the bond between the inner layer 21 and the collar 17 is particularly strong and tight. Outside the longitudinal extension of the collar 17, the outermost layer of the film 4' still corresponds to the layer 20.

Therefore, in this embodiment, the contact surface at which the inner circumferential surface 19 of the collar 17 is attached to the film 4' corresponds to the inner layer 21 of the film 4'.

FIG. 3 shows a sectional view of the cartridge 1 according to a second embodiment. The cartridge 1 is similar to the cartridge 1 shown in FIG. 2. In addition, the cartridge 1 includes an additional intermediate film piece 23 arranged at the front end 8 of the film 4' between the film 4' and the inner circumferential surface 19 of the collar 17. A longitudinal extension of the intermediate film piece 23 along the longitudinal direction A is shorter than the longitudinal extension of the film 4'. For example, the longitudinal extension of the intermediate film piece 23 corresponds to the longitudinal extension of the collar 17 in the longitudinal direction A. In other words, the intermediate film piece 23 does not extend beyond an inner surface of the head part 6. The intermediate film piece 23 can comprise a rear surface extending radially along the inner surface of a front section of the head part 6, as here shown in FIG. 3. With this, the intermediate film piece 23 forms a cap and/or a lid forming a connection between the cartridge walls 4 formed by the flexible film 4' and the head part 6.

On the right-hand side of FIG. 3, an enlarged view of the connection between the collar 17 of the head part 6 and the film 4' via the additional intermediate film piece 23 is shown. The intermediate film piece 23 comprises an inner surface 24 and an outer surface 25. The intermediate film piece 23 can be configured as a multilayer film, wherein the inner surface 24 is provided by the innermost layer and the outer surface 25 by the outermost layer of the multilayer film piece 23. The multilayer film piece 23 can comprise additional intermediate layers which are not shown here.

The material of the outer surface 25 of the intermediate film piece 23 is configured to bond strongly to the material of the inner circumferential surface 19 of the collar 17. The material of the inner surface 24 is configured to bond strongly to the material of the outer surface of the film 4'. The materials of the inner surface 24 and of the outer surface 25 are different and in particular materials which do not bond as strongly to one another as the desired bond between the respective components.

When a multilayer film is configured as the additional intermediate film piece 23, the outermost layer can be made of the same material as the head part 6 respectively as the collar 17, wherein the innermost layer can be made of the same material as the material of the outer surface of the flexible film 4' forming the cartridge wall 4. It is thus not necessary that the outer surface of the flexible film 4' is made of a material that has to bond to the inner circumferential surface 19 of the collar 17.

For example, at least one of the layers of the intermediate film piece 23 and/or of the film 4' can be chosen from one of the following materials or a combination thereof: polyethylene, polyamide, polypropylene and/or aluminum.

During a bonding process, which for example includes injection molding and/or gluing and/or welding, the innermost layer 24 of the additional film piece 23 sealingly and nonreleasably bonds to the outermost layer of the flexible film 4', while the outermost layer 25 of the additional film piece 23 sealingly and non-releasably bonds to the inner circumferential surface 19 of the collar 17 of the head part 6. The bonding process can occur for example during an injection molding process of the head part 6.

In this second embodiment, the contact surface at which the inner circumferential surface 19 of the collar 17 is attached to the film 4' therefore corresponds to the outer surface 25 provided by the additional intermediate film piece 23. In the radial direction B outside the head part 6, the outer surface of the film 4' is provided by an outermost layer 20 of the film 4' that, within the collar 17, is bonded to the inner layer 24 of the intermediate film piece 23.

FIG. 4 shows a part sectional view of the cartridge 1 according to a third embodiment, wherein the head part 6 of the cartridge 1 is similar to the head part 6 of the cartridge 1 shown in FIG. 2. In particular, FIG. 4 shows a partial view of the head part 6 and the front end 8 of the film 4'. The film 4' comprises an inner surface 26 and an outer surface 27, which can be provided by an innermost layer respectively an outermost layer of the film 4'. In a radial direction B, the inner surface 26 faces inwardly of the outer surface 27 in a region outside the front end 8 of the film 4'.

The front end 8 of the film 4' is folded to the outside so that the outer surface 27 of the front end 8 of the film 4' contacts the outer surface 27 of an adjacent portion of the film 4' and the inner surface 26 of the front end 8 of the film 4' faces in the radial direction B radially outwardly. The folded front end 8 of the film 4' is therefore connected to the inner circumferential surface 19 of the collar 17 via its inner surface 26.

For example, the inner surface 26 respectively the innermost layer of the film 4' is made of a material that bonds strongly to the material of the collar 17 of the head part 6. The material of the outer surface 27 respectively the outer layer of the film 4' is different and does not necessarily bond strongly to the material of the collar 17. For example, the inner surface 26 respectively the innermost layer of the film 4' is made of the same material as the collar 17.

In this third embodiment, the contact surface at which the inner circumferential surface 19 of the collar 17 is attached to the film 4' therefore corresponds to the inner surface 26 of the film 4'.

It should be noted that a height of the collar 17 in the longitudinal direction A can be selected in the range of 3 to 15 mm. A height of the contact surface, i.e. of the front end of the film 4', between the respective film 4' and the collar 17 and also of the intermediate piece 23 can be selected in the range of 3 to 15 mm. Thereby the film can be reliably attached to the collar 17 on the avoidance of leaks.

Figure 5A:
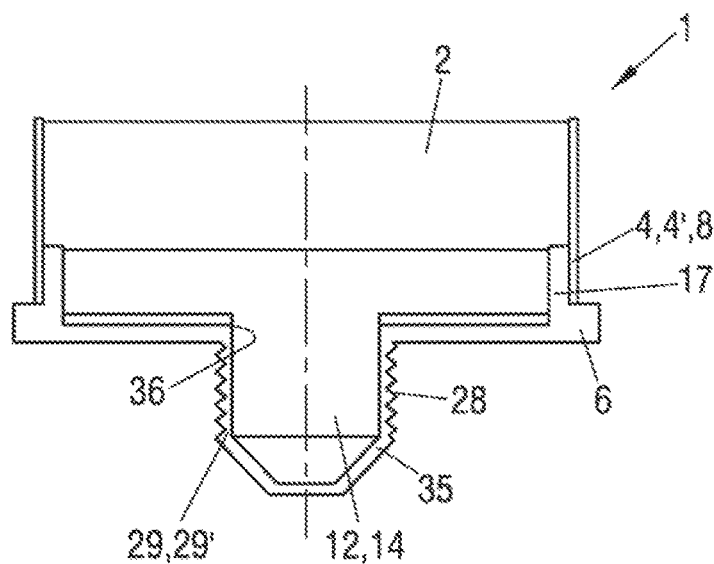
FIG. 5A to 5C are schematic sectional views of various types of head parts of single component cartridges, with a respective second film being attached to the head part.
Figure 5B:
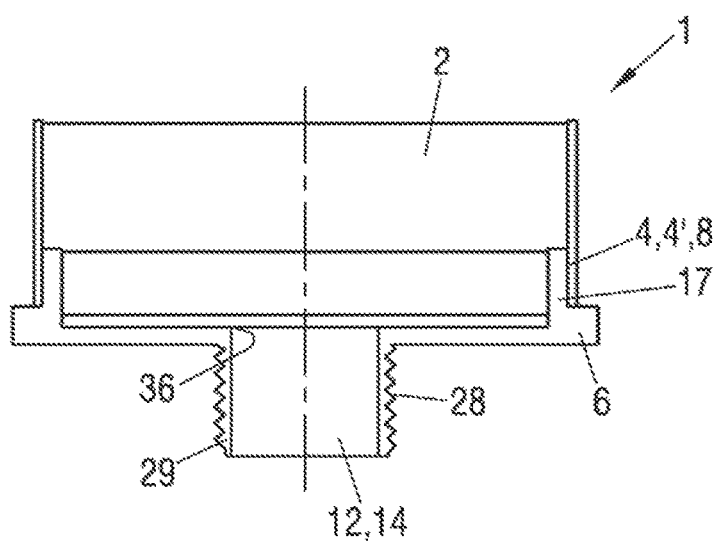
Figure 5C:
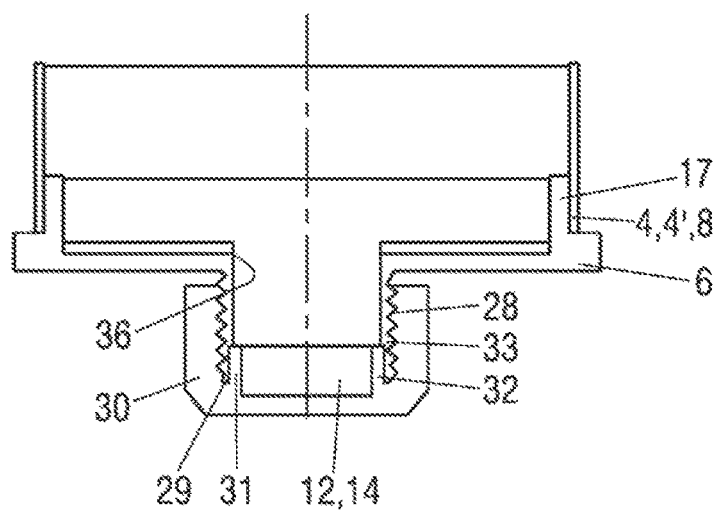

FIGS. 5A to 5C show schematic sectional views of various types of head parts 6 of single component cartridges 1, with respective second films 34 being attached to the head part 6. The connection of the first film 4' at the collar 17 can take place in the same manner as described in the foregoing.

FIG. 5A shows a first type of single component cartridge 1, the dispensing outlet 12 of which has an outer thread 28 extending over a cylindrically shaped portion of the dispensing outlet 12 that extends from the head part 7 to the front end 29 of the dispensing outlet 12. Mixing tips, outlets and caps can be connected to the single component cartridge 1 via the outer thread 28.

The front end 29 comprises a sealed front end 29' at its very end. Thus in the storage state of the cartridge 1, the outlet passage 14 is sealed off at an end 35 of the passage 40 that is opposed opposite to the end 36 directly adjacent to the cartridge chamber 2. The sealed front end 29' like the dispensing outlet 12 is made from the same material as the head part 6. Such a sealed front end 29' is expediently used in backfilling applications.

In order to use such a single component cartridge 1, the front end 29 is typically separated from the dispensing outlet 12, typically by cutting the sealed front end 29' away from the front end 29.

In order to prevent the outer thread 28 from becoming damaged when cutting away the sealed front end 29', the sealed front end 29' is presently formed at a V-shaped portion and is typically cut at the shanks of the V-shape. Naturally other shapes of the sealed front end 29', such as a dome shaped end, a trapezoidal shaped end etc. are possible.

FIG. 5B shows a further type of single component cartridge 1 in which the second film 34 extends over the complete end face 37 of the head part 6 and thereby bridges the outlet passage 14 at the end 36. Also this design is suited to backfilling operations, since the dispensing outlet 12 is sealed off in this way. In contrast to the design shown in FIG. 5A, the end 35 of the dispensing outlet 12 arranged opposite to the end 36 is open even in the storage state of the cartridge 1.

In order to use the cartridge 1, the second film 34 has to be pierced. The tool (not shown) used to pierce the second film 34 can either be a separate tool, or it can be arranged at a mixer or outlet (also not shown) that is connected to the cartridge 1 via the outer thread and that then comprises some form of piercing member that projections through the outlet passage 14 and that is configured to engage the second film 34.

The type of single component cartridge 1 shown in FIG. 5C comprises a cap 30 that is arranged at the front end 29 via the outer thread 28 and a corresponding inner thread 33. In order to seal the front end 29, the cap 30 comprises an annular projection 31 projecting into the passage 14. In some instances a seal 32 can be arranged on an outer surface of the annular projection 31 or an inners surface of the dispensing outlet 12 in order to seal between the cap 30 and the front end 29. The cartridge 1 shown in FIG. 5C can be used in both front and back filling applications, but is generally used in front filling applications.

The invention claimed is:

1. A cartridge for a medium to be dispensed comprising:
a rigid head part having a dispensing outlet; and
a flexible film forming a cartridge wall, with the film comprising at least one inner surface and an outer surface, and with the film bounding a cartridge chamber for the medium to be dispensed, extending at least partially in a longitudinal direction of the cartridge and having a front end that is connected to the head part, the head part comprising a collar, with the collar surrounding the dispensing outlet in a radially outer region of the head part, extending in the longitudinal direction and having an inner circumferential surface, and the front end of the film being sealingly and non-releasably connected to the inner circumferential surface of the collar, and the inner circumferential surface of the collar being attached to the film at a contact surface that is different from the outer surface of the film,
the film being a multilayer film comprising an outermost layer defining the outer surface of the film, the multilayer film comprising at least one inner layer arranged radially inwardly of the outermost layer, the outermost layer and the at least one inner layer are formed from different materials, and the contact surface being the at least one inner layer of the multilayer film, and
a material of the outermost layer of the film and a material of the collar being different and are materials which do not bond or bond less strongly one to another than a bond formed between a material of the at least one inner layer of the film and the material of the collar, the head part formed by injection molding, and the material of the outermost layer is configured to melt away in a region of the contact surface of the front end of the film due to a processing temperature during an injection molding process so that the at least one inner layer and the inner circumferential surface of the collar are bonded one to another during the injection molding process.

2. The cartridge of claim 1, wherein a longitudinal extension of an additional flexible film piece is shorter than a longitudinal extension of the flexible film forming the cartridge wall.

3. The cartridge of claim 1, wherein the inner circumferential surface of the collar and the contact surface are bonded together to form an integral connection structure.

4. The cartridge of claim 1, wherein an intermediate film piece is disposed between the front end of the film and the inner circumferential surface of the collar, the intermediate film piece comprises an inner layer and an outer layer, a material of the outer layer is configured to bond strongly to a material of the inner circumferential surface of the collar and a material of the inner layer is configured to bond strongly to a material of the outer surface of the film.

5. The cartridge of claim 4,
wherein the materials of the inner layer and of the outer layer are different.

6. The cartridge of claim 4,
wherein the materials of the inner layer and of the outer layer are materials which do not form a bond therebetween or only form a bond which is less strong than a bond formed at the contact surface.

7. The cartridge of claim 4, wherein the intermediate film piece covers a rear surface of the head part defining a front end of the cartridge chamber and comprising the dispensing outlet.

8. The cartridge of claim 1, wherein the head part comprises plastic or consists of plastic.

9. The cartridge of claim 1, wherein at least a part of the film connected to the head part comprises plastic or consists of plastic.

10. The cartridge of claim 9,
wherein plastic of the head part and the plastic of the part of the film connected to the head part are selected from plastics which form a bond therebetween on melting.

11. The cartridge of claim 9,
wherein plastic of the head part and the plastic of the part of the film connected to the head part are identical.

12. The cartridge of claim 1, wherein a fixation element is disposed on the inner circumferential surface of the collar.

13. The cartridge of claim 12, wherein the fixation element includes protrusions, ribs, pins, hooks, webs, notches, flutes, recesses, or grooves.

14. The cartridge of claim 1, wherein the cartridge is a one-component cartridge comprising one cartridge chamber.

15. The cartridge of claim 1, wherein the cartridge is a two-component cartridge comprising two cartridge chambers.

16. The cartridge of claim 15, wherein the head part of a first cartridge chamber of the two cartridge chambers is formed in one piece with the head part of a second cartridge chamber of the two cartridge chambers or the head part of the first cartridge chamber being connectable to the head part of the second cartridge chamber.

17. The cartridge of claim 1, wherein a tubular support sleeve is configured to surround the cartridge wall over an entire length thereof and has a front end which is configured to abut or to be connected to the head part.

18. The cartridge of claim 1, wherein the cartridge is filled with a material.

19. The cartridge of claim 1,
wherein the cartridge s a single component cartridge and the cartridge chamber is the only one cartridge chamber bound by the flexible film forming the cartridge wall.

20. The cartridge of claim 1,
wherein a second film is attached to the head part to cover an internal end face of the head part.

21. The cartridge of claim 20, wherein the second film bridges an outlet passage leading from the cartridge chamber to an end of the dispensing outlet.

22. A dispensing assembly comprising:
the cartridge in accordance with claim 1 with the cartridge chamber being filled with a material;
a sleeve for the cartridge chamber; and
a dispenser into which the cartridge is inserted.

23. The dispensing assembly of claim 22;
further comprising a mixing tip attached to the dispensing outlet.

24. A method of manufacturing the cartridge according to claim 1, the method comprising:
placing the film on a core of a mold;
injection molding the head part in a head space of the mold to form the head part with the collar and to sealingly and non-releasably bond the front end of the film to the inner circumferential surface of the collar, with the contact surface between the front end of the film and the inner circumferential surface of the collar being different from the outer surface of the film.

* * * * *